United States Patent
Havlena (10) Patent No.: US 6,832,134 B2
(45) Date of Patent: Dec. 14, 2004

(54) COORDINATION IN MULTILAYER PROCESS CONTROL AND OPTIMIZATION SCHEMES

(75) Inventor: Vladimir Havlena, Prague (CZ)

(73) Assignee: Honeywell International Inc., Morristown, NJ (US)

(*) Notice: Subject to any disclaimer, the term of this patent is extended or adjusted under 35 U.S.C. 154(b) by 0 days.

(21) Appl. No.: 10/292,708

(22) Filed: Nov. 12, 2002

(65) Prior Publication Data

US 2004/0093124 A1 May 13, 2004

(51) Int. Cl.$^7$ .............................. G05D 3/12; G05D 5/00; G05D 9/00; G05D 11/00; G05B 13/02
(52) U.S. Cl. ............................ 700/291; 700/36; 700/44
(58) Field of Search .............................. 700/28, 32, 33, 700/36, 44, 291

(56) References Cited

U.S. PATENT DOCUMENTS

| | | | |
|---|---|---|---|
| 4,110,825 A | * 8/1978 | Fox et al. | 700/291 |
| 4,532,761 A | 8/1985 | Takaoka et al. | |
| 5,268,835 A | * 12/1993 | Miyagaki et al. | 700/31 |
| 5,704,011 A | * 12/1997 | Hansen et al. | 706/25 |
| 6,438,430 B1 | * 8/2002 | Martin et al. | 700/28 |
| 6,439,469 B1 | 8/2002 | Gruber et al. | |
| 6,591,225 B1 | * 7/2003 | Adelman et al. | 702/182 |
| 6,597,958 B1 | * 7/2003 | Starr | 700/29 |
| 6,681,155 B1 | * 1/2004 | Fujita et al. | 700/287 |
| 6,714,899 B2 | * 3/2004 | Kassmann | 703/2 |
| 2003/0018399 A1 | * 1/2003 | Havener et al. | 700/28 |

FOREIGN PATENT DOCUMENTS

| | | |
|---|---|---|
| EP | 0 465 137 A1 | 1/1992 |
| GB | 2 166 198 A | 4/1986 |

OTHER PUBLICATIONS

Havlena, V. and Findejs, J., "Application of MPC To Advanced Combustion Control", IFAC Symposium on Power Plants & Power Systems Control, Brussels, 2000.
Kratochvil, S., Havlena, V., Findejs J., and Jech J., "Boiler House Optimisation in the CHP Plant TOT Otrokovice", Euroheat & Power, European Technology Review 2002, pp. 12–15.

* cited by examiner

Primary Examiner—Albert W. Paladini
Assistant Examiner—Ryan A. Jarrett
(74) Attorney, Agent, or Firm—Kris T. Fredrick (57) ABSTRACT

Loads 1, 2, ..., N are controlled by predicting a total energy requirement for the loads 1, 2, ..., N at prediction points k=0, 1, 2, ..., K, by allocating the total energy requirement to the loads 1, 2, ..., N at prediction points k=0, 1, 2, ..., K, by determining a dynamic energy demand requirement for each of the loads 1, 2, ..., N at prediction points k=0, 1, 2, ..., K based on the allocated energy requirements, and by controlling the loads 1, 2, ..., N based on the dynamic energy demand requirements.

51 Claims, 3 Drawing Sheets

COORDINATION IN MULTILAYER PROCESS CONTROL AND OPTIMIZATION SCHEMES

TECHNICAL FIELD OF THE INVENTION

The present invention relates to dynamic load control.

BACKGROUND OF THE INVENTION

Controls have been developed for a variety of different load control processes. For example, in steam generation plants, several boilers and/or other types of steam generators generate steam and supply the steam to a common header. If individual pressure controllers with integral action running in parallel were used to control the boilers, instability in the operation of the boilers could result.

Therefore, pressure in the header is typically controlled by a single master pressure controller (MPC) that produces a total energy requirement (usually in terms of fuel feed) for the plant input. An energy allocation module divides the total energy requirement into separate fuel feed demands (i.e., set points) for the individual boilers.

The division of the total energy requirement implemented by the energy allocation module should be cost optimized according to varying economic conditions (such as price of fuels and electricity, environmental limits, etc.) and according to various constraints such as total production demand, technological constraints, runtime hours, and life time consumption. The underlying optimization problem is well known and has been solved in a variety of ways and with various levels of complexity since the 1960's. For example, Real Time Optimizers have been implemented in order to optimize the cost of operating one or more loads.

These Real Time Optimizers have detected a steady state load requirement and then have provided control signals that optimize the cost of operating the loads based on this steady state load requirement. In order to operate in this fashion, the Real Time Optimizers have had to wait for transient process disturbances to settle out so that a steady state condition exists before such Optimizers can invoke their optimization procedures. However, for processes with slow dynamics and/or high levels of disturbances, the dependence of Real Time Optimizers on steady state information substantially deteriorates the performance of the control system, as no optimization is performed during the transients created by disturbances such as changes in set point and/or changes in load.

While predictive controllers have been used in the past, predictive controllers have not been used with Real Time Optimizers such that the Real Time Optimizers dynamically respond to target load values of the predicted process variables projected to the end of a prediction horizon. In one embodiment of the present invention, predictive controllers and Real Time Optimization are combined in this fashion in order to more effectively control loads during disturbances such as changes in set point and changes in load.

SUMMARY OF THE INVENTION

According to one aspect of the present invention, a process control system for controlling a load comprises a predictive controller and a real time optimizer. The predictive controller predicts an energy requirement for the load at prediction points k=0, 1, 2, . . . , K based on a steady state target energy requirement for the load. The real time optimizer determines an optimized dynamic energy demand requirement for the load at the prediction points k=0, 1, 2, . . . , K based on the predicted energy requirement, and controls the load based on the dynamic energy demand requirement.

According to another aspect of the present invention, a process control method for controlling loads 1, 2, . . . , N comprises the following: predicting, in a predictive controller, an energy requirement for each of the loads 1, 2, . . . , N at prediction points k=0, 1, 2, . . . , K based on a steady state target allocation for each of the loads 1, 2, . . . , N; determining, in a real time optimizer, a dynamic energy demand requirement for each of the loads 1, 2, . . . , N at prediction points k=0, 1, 2, . . . , K based on the predicted energy requirements; and, controlling the loads 1, 2, . . . , N based on the dynamic energy demand requirements.

According to yet another aspect of the present invention, a process control method for controlling loads 1, 2, . . . , N comprises the following: predicting, by way of a predictive controller, a total energy requirement for the loads 1, 2, . . . , N at prediction points k=0, 1, 2, . . . , K; allocating, by way of a real time optimizer, the total energy requirement to the loads 1, 2, . . . , N at the prediction points k=0, 1, 2, . . . , K based on a steady state target for each of the loads 1, 2, . . . , N; determining, by way of the real time optimizer, a dynamic energy demand requirement for each of the loads 1, 2, . . . , N at the prediction points k=0, 1, 2, . . . , K based on the allocated energy requirements; and, controlling the loads 1, 2, . . . , N based on the dynamic energy demand requirements.

BRIEF DESCRIPTION OF THE DRAWINGS

These and other features and advantages will become more apparent from a detailed consideration of the invention when taken in conjunction with the drawings in which.

DETAILED DESCRIPTION

In one embodiment of the present invention, real-time, on-line, optimized dynamic allocation of time varying total demand among loads, taking into account various constraints, is provided. The resulting dynamic allocation is composed of a target allocation $F_i^{targ}(k)$ and a dynamic portion $w_i^{dyn}(k)\Delta F^{tot}(k)$ that is proportional to the loads' dynamic weights $w_i^{dyn}(k)$ for loads i=1, . . . , N. The target allocation $F_i^{targ}(k)$ is provided by a Real Time Optimizer using load cost curves which can be evaluated from efficiency or consumption curves, etc. Likewise, the loads' dynamic weights $w_i^{dyn}(k)$ may also be set by the Real Time Optimizer or by an operator.

The algorithm that implements the optimized dynamic allocation is used with a model-based predictive controller. In this case, a steady state load balance at the end of a prediction horizon can be predicted as the target value for computation of the target economic allocation, and dynamic deviations in the transient part of the prediction period can be allocated in proportion to the dynamic weights. In this way, the system of the present invention need not wait for loads to achieve a steady state condition following a disturbance to economically control the loads.

Moreover, because a predictive controller is used, rate of change constraints, in addition to the absolute constraints, are introduced so as to provide a positive impact on the stability of the control process and on the stresses and life time of the control system equipment.

The algorithm that is implemented by the control system may be modular. For example, the target allocation $F_i^{targ}(k)$ is provided by an optimization routine using the loads' cost curves which can be evaluated from efficiency curves, etc. This modular structure allows the addition of new features that, for example, take into account burner configuration, fuel mixing, etc. without changing the basic algorithm. An off-line what-if analysis as a decision support tool is also possible using existing routines.

Figure 1:
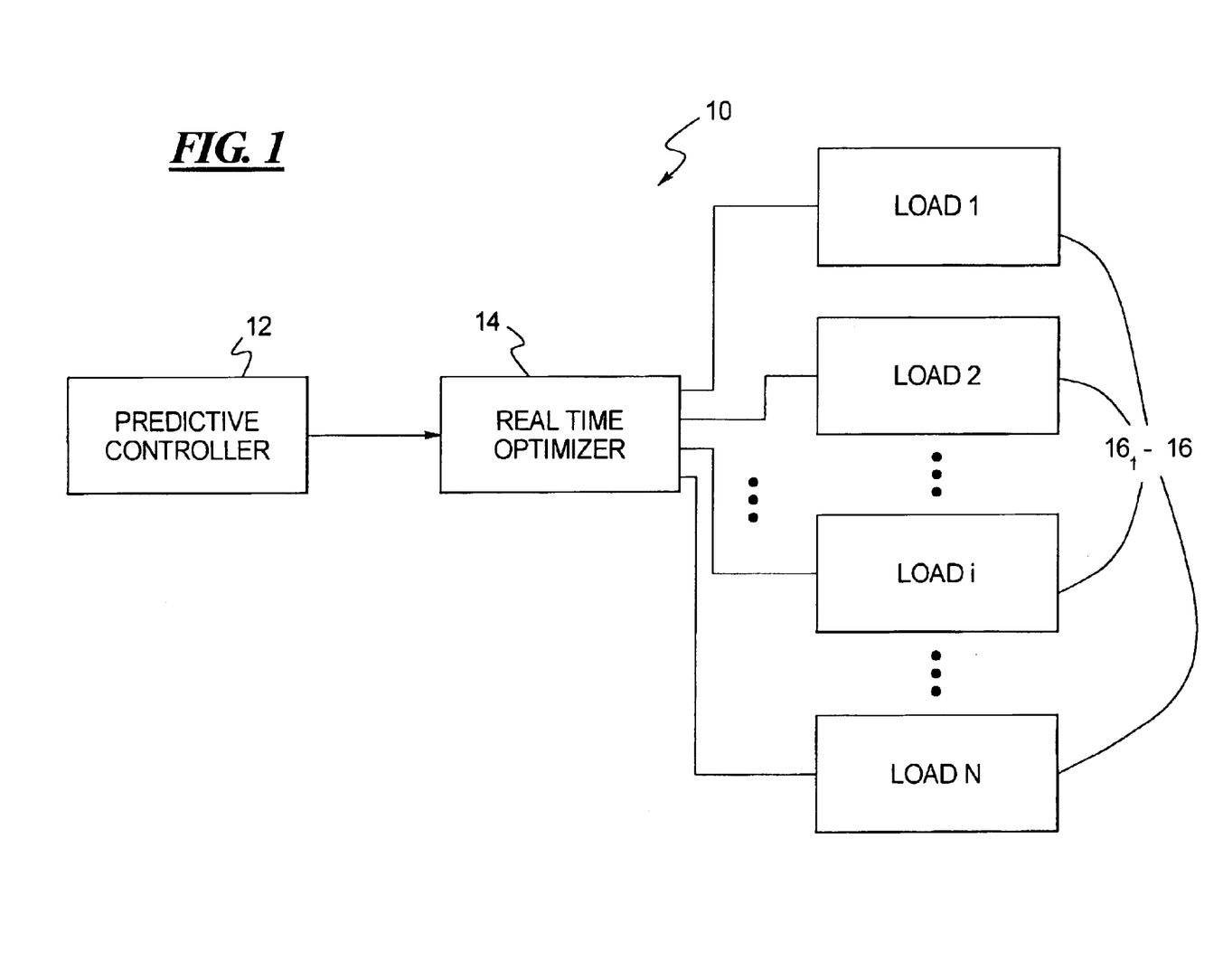
FIG. 1 illustrates a control system according to an embodiment of the invention.

As shown in FIG. 1, a control system 10 includes a predictive controller 12, a Real Time Optimizer 14, and a plurality of loads $16_1$–$16_N$. For example, the loads $16_1$–$16_N$ can be boilers, turbines, compressors, chillers, etc. Thus, if i=1, 2, . . . , N designates the loads $16_1$–$16_N$ in FIG. 1, then N designates the number of loads.

The predictive controller 12 suitably senses the load requirements (e.g., pressure, and/or fuel feed, and/or temperature, etc.) of the loads $16_1$–$16_N$ and provides a predicted total load energy demand $F^{tot}$ to the real time optimizer 14 that divides the total load energy demand $F^{tot}$ according to a predicted target allocation $F_i^{targ}(k)$ into individual allocated fuel feed demands (or set points) $F_i^{dyn}(k)$ for the individual loads $16_1$–$16_N$.

The predictive controller 12 may be any of the controllers supplied by Honeywell under part numbers HT-MPC3L125, HT-MPC3L250, HT-MPC3L500, HT-MPC6L125, HT-MPC6L250, and HT-MPC6L500, or may be any other predictive controller that projects a system response to a set point, load, or other disturbance. The real time optimizer 14 may be any of the real time optimizers supplied by Honeywell under part numbers HT-ELA3L125, HT-ELA3L250, HT-ELA3L500, HT-ELA6L125, HT-ELA6L250, and HT-ELA6L500, or may be any other real time optimizer that can be modified so as to react to load change predictions in order to cost effectively allocate load demand among a plurality of loads.

Because the predictive controller 12 is a predictive controller, the total load energy demand $F^{tot}$ is a trajectory, i.e., a sequence of values corresponding to a sequence of prediction times k up to a prediction horizon K, where k=0, 1, . . . , K. Accordingly, the total load energy demand $F^{tot}$ may be given by the following equation:

$$F^{tot} = (F^{tot}(1), F^{tot}(2), \ldots, F^{tot}(K)) \quad (1)$$

The dynamic allocation trajectories $F_i^{dyn}(k)$ for the loads are determined by the real time optimizer 14 in two steps. First, the unconstrained allocation trajectories $F_i^{unconstr}(k)$ are determined for the loads i=1, 2, . . . , N. Second, the unconstrained allocation trajectories $F_i^{unconstr}(k)$ for the loads i=1, 2, . . . , N are modified to satisfy constraints and to approach the unconstrained allocation as much as possible (in the sense of minimum least squares of deviations) in order to obtain the dynamic allocation trajectories $F_i^{dyn}(k)$.

In the first step, the unconstrained allocation trajectories $F_i^{unconstr}(k)$ are defined by means of two sets of parameters: (1) the target allocation $F_i^{targ}(k)$, and (2) the dynamic weights $w_i^{dyn}(k)$. Accordingly, the unconstrained allocation trajectories $F_i^{unconstr}(k)$ are defined according to the following equation:

$$F_i^{unconstr}(k) = F_i^{targ}(k) + w_i^{dyn}(k) \Delta F^{tot}(k) \quad (2)$$

where $$\Delta F^{tot}(k) = F^{tot}(k) - \sum_{i=1}^{N} F_i^{targ}(k) \quad (3)$$

for each load i=1, 2, . . . , N and for each trajectory point k=0, 1, . . . , K.

The target allocation $F_i^{targ}(k)$ corresponds to values around (or near) which the unconstrained allocation $F_i^{unconstr}(k)$ varies, and the dynamic weights $w_i^{dyn}(k)$ are an indication of the sensitivities of the loads $16_1$–$16_N$ to the changes in the total load demand.

Figure 2:
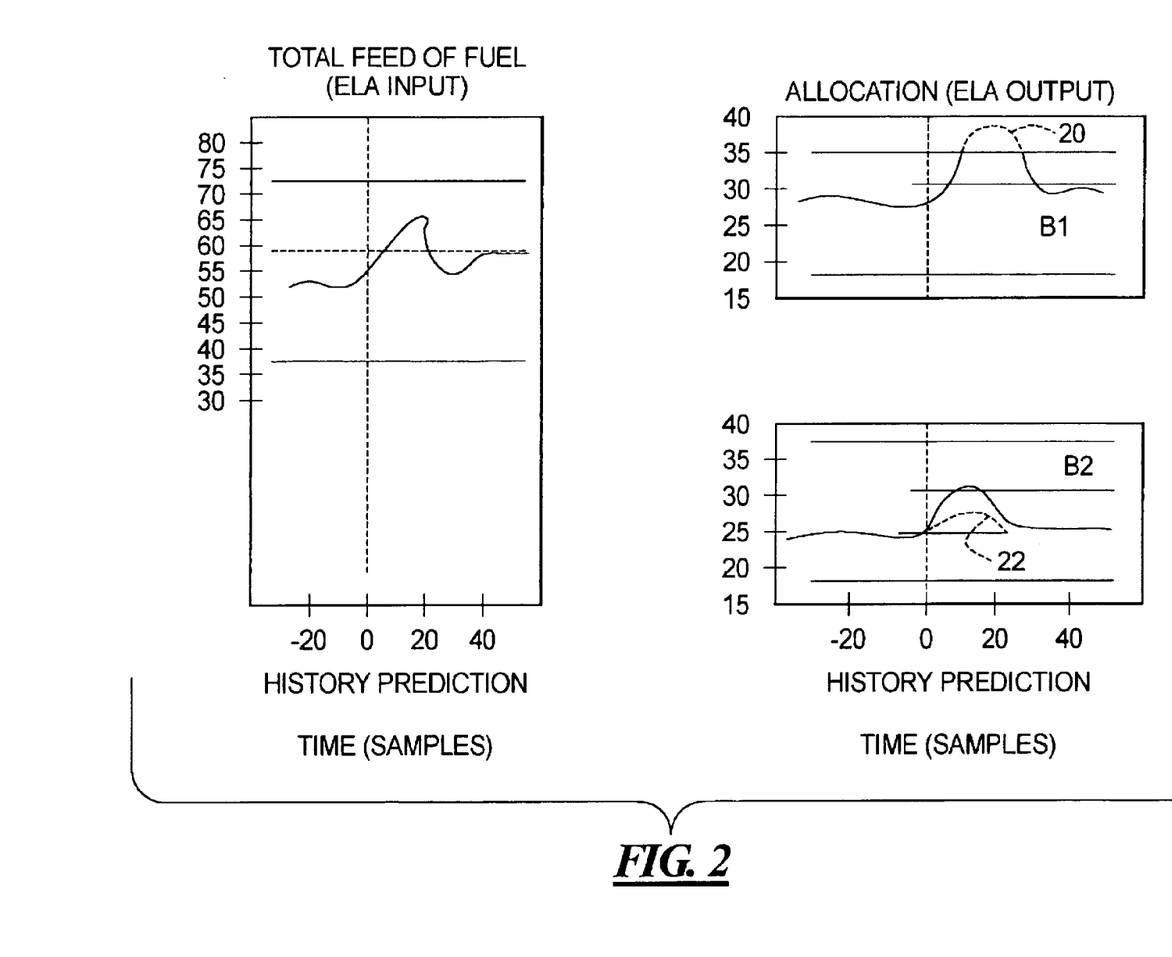
FIG. 2 illustrate graphs useful in explaining the present invention.

FIG. 2 illustrates an example of dynamic fuel feed allocation with the samples on the left side of the vertical dashed line representing historical data and the samples on the right side of the vertical dashed line representing predicted (modeled) trajectories. The samples may be taken at time instants $t_k = kT_s$, where $T_s$ is a given sampling period. The total load energy demand $F^{tot}$ shown in the left graph is allocated between a boiler (load) B1 as shown in the top right graph and a boiler (load) B2 as shown in the bottom right graph. The dashed curves 20 and 22 represent the unconstrained allocation trajectories $F_{i=1}^{unconstr}(k)$ and $F_{i=2}^{unconstr}(k)$ for loads B1 and B2, respectively. The solid line curve in the graph on the left represents the total load energy demand $F^{tot}$ predicted by the predictive controller 12, and the solid line curves in the graphs on the right represent the dynamically allocation fuel feeds (set points) $F_{i=1}^{dyn}(k)$ and $F_{i=2}^{dyn}(k)$ for loads B1 and B2, respectively, as produced by the real time optimizer 14. The horizontal solid lines represent absolute limits that are placed on the total load energy demand $F^{tot}$ and the dynamically allocation fuel feeds (set points) $F_{i=1}^{dyn}(k)$ and $F_{i=2}^{dyn}(k)$, respectively. The horizontal dashed lines represent the target allocations $F_i^{targ}(k)$. Moreover, for the example shown in FIG. 2, the ratio of the dynamic weights used for loads B1 and B2 are assumed to be given by the following equation:

$$\frac{w_{i=1}^{dyn}(k)}{w_{i=2}^{dyn}(k)} = \frac{3}{1} \quad (4)$$

Accordingly, the changes in total energy load demand $\Delta F^{tot}(k)$ are divided into the loads $16_1$–$16_N$ proportionally to the dynamic weights so that the allocated load energy requirement (e.g., fuel feed value) is composed of the target value $F_i^{targ}(k)$ plus a portion from the transient deviations $\Delta F^{tot}(k)$. The dynamic weights may be provided by the operator. Alternatively, the dynamic weights may be calculated automatically. For example, they may be calculated automatically based on the number of running coal pulverizers, burners, etc.

A balance condition exists where the sum over the loads $16_1$–$16_N$ of the target allocations $$\sum_{i=1}^{N} F_i^{targ}(k)$$

is equal to total load energy demand $F^{tot}(k)$ in equation (3).

In the balance condition, $\Delta F^{tot}(k)$ is zero, and the following relationship:

$$\sum_{i=1}^{N} F_i^{unconstr}(k) = F^{tot}(k) \quad (5)$$

is fulfilled for each trajectory point k, assuming that the non-negative dynamic weights are normalized to 1 according to the following equation:

$$\sum_{i=1}^{N} w_i^{dyn}(k) = 1 \quad (6)$$

As discussed above, the target allocation $F_i^{targ}(k)$ is the prediction horizon for load i and is allocated to load i by the real time optimizer 14 based upon various economic conditions. The target allocation $F_i^{targ}(k)$ may be evaluated from offsets.

As indicated by FIG. 2, the target allocation $F_i^{targ}(k)$ is assumed to be constant during the prediction period unless the target allocation $F_i^{targ}(k)$ is significantly changed, such as by the operator. When the target allocation $F_i^{targ}(k)$ is significantly changed, linear interpolation from the old value to the new one, instead of using the new value for the whole prediction period, may be used in order to assure bumpless operation.

If the target allocation $F_i^{targ}(k)$ is set (such as by the operator as indicated above) so that it is time-invariant up to the next operator intervention, the sum of the target allocation $F_i^{targ}(k)$ over all loads cannot follow the time-varying target of the total load energy demand $F^{tot}$, i.e., the value of the total load energy demand $F^{tot}$ at the end of prediction horizon. However, the appreciable balance condition can be fulfilled if the target allocations $F_i^{targ}(k)$ are evaluated using offsets $F_i^{off}$ as given by the following equation:

$$F_i^{targ} = F_i^{off} + F^{av} \quad (7)$$

where $F^{av}$ is determined from the following balance condition:

$$F^{tot}(K) = \sum_{i=1}^{N} F_i^{targ} = \sum_{i=1}^{N} F_i^{off} + NF^{av} \quad (8)$$

Thus, even if offsets (defining differences between loads) are constant, the term $$\sum_{i=1}^{N} F_i^{targ}$$

is time varying and equal to $F^{tot}(K)$.

As indicated above, the dynamic weights $w_i^{dyn}(k)$ may be set by the operator. The dynamic weights $w_i^{dyn}(k)$ are assumed to be constant during the prediction period unless they are significantly changed by the operator. If they are changed, they may be ramped using a linear interpolation algorithm. Also, the dynamic weights $w_i^{dyn}(k)$ are normalized to 1 as discussed above in relation to equation (6).

As indicated above, the unconstrained allocation trajectories $F_i^{unconstr}(k)$ do not need to satisfy constraints. On the other hand, the dynamic allocation trajectories $F_i^{dyn}(k)$ are required to be constrained. Constraints imposed by the real time optimizer 14 may be generated by the operator. Alternatively and/or additionally, constraints may be algorithm-generated constraints that are propagated from slave controllers on all levels of a sub cascade. Also, constraints may be time varying. Moreover, constraints may be absolute limits (such as low and high limits $F_i^{min}(k)$ and $F_i^{min}(k)$ on the dynamic allocation trajectories $F_i^{dyn}(k)$), and constraints may be rate of change limits (such as decremental and incremental limits $F_i^-(k)$ and $F_i^+(k)$, respectively).

While absolute constraints must not be violated, rate of change constraints can be violated. However, such a violation should be highly penalized so as to avoid undesired thermal stress, which may have a negative impact on the life of the control system equipment.

In the second step of calculating the dynamic allocation trajectories $F_i^{dyn}(k)$, the dynamic allocation trajectories $F_i^{dyn}(k)$ are calculated based on the unconstrained allocation trajectories $F_i^{unconstr}(k)$. The dynamic allocation trajectories $F_i^{dyn}(k)$ must satisfy the total load energy demand $F^{tot}$ (as the unconstrained allocation trajectories $F_i^{unconstr}(k)$ must also do) according to the following equation:

$$\sum_{i=1}^{N} F_i^{dyn} = F^{tot} \quad (9)$$

In addition, the dynamic allocation trajectories $F_i^{dyn}(k)$ are constrained by the absolute constraints, considered as hard constraints, and the rate of change constraints, considered as soft constraints in that they can be violated by arbitrary (although highly penalized) values $z_1(k)$.

These constraints are given by the following expressions:

$$F_i^{min} \leq F_i^{dyn} \leq F_i^{max} \quad (10)$$

$$-F_i^- \leq \Delta F_i^{dyn} - z_i \leq F_i^+ \quad (11)$$

where $$F_i^{dyn} = \begin{pmatrix} F_i^{dyn}(0) \\ \vdots \\ F_i^{dyn}(K) \end{pmatrix} \text{ for } i = 1, \ldots, N \quad (12)$$

$$F^{dyn} = \begin{pmatrix} F_1^{dyn} \\ \vdots \\ F_n^{dyn} \end{pmatrix} \quad (13)$$

Expressions similar to expressions (12) can be written for $F_i^{min}$, $F_i^{max}$, $F_i^-$, $F_i^+$, and $z_i$. Each of the vectors $F_i^{dyn}$, $F_i^{min}$, $F_i^{max}$, $F_i^-$, $F_i^+$, and $Z_i$ has a corresponding dimension K+1. Also, expressions similar to expression (13) can be written for $F^{min}$, $F^{max}$, $F^-$, and $F^+$. Each of the vectors $F^{dyn}$, $F^{min}$, $F^{max}$, $F^-$, and $F^+$ has a corresponding dimension N(K+1).

A difference vector $\Delta F_i^{dyn}$ is defined according to the following equation:

$$\Delta F_i^{dyn} = DF_i^{dyn} - F_i^{act} \quad (14)$$

where D is a (K+1) by (K+1) difference matrix given by the following equation:

$$D = \begin{pmatrix} 1 & & & \\ -1 & 1 & & \\ & \ddots & \ddots & \\ & & -1 & 1 \end{pmatrix} \quad (15)$$

and where $F_i^{act}$ are (K+1) dimensional vectors having the corresponding loads' actual input energy requirements (such as boilers' actual fuel feed) in the first component and zeros elsewhere as given by the following equation:

$$F_i^{act} = \begin{pmatrix} F_i^{act} \\ 0 \\ \vdots \\ 0 \end{pmatrix} \quad (16)$$

The actual input energy requirements $F_i^{act}$ may be sensed by appropriate sensors located at the energy inputs of the loads $16_1$–$16_N$.

Variables $z_i(k)$ are introduced in order to penalize violation of the rate of change constraints. If $z_i(k)$ is equal to zero (no penalty), $\Delta F_i^{dyn}(k)$ must lie within rate of change limits according to the inequalities (11). If $\Delta F_i^{dyn}(k)$ is not within corresponding limits, the variable $z_i(k)$ is equal to the deviation of $\Delta F_i^{dyn}(k)$ from the range $(-F_i^-(k), F_i^+(k))$, and the limit violation penalty defined as the norm of z becomes non-zero.

The dynamic demand allocation $F^{dyn}$ is obtained by minimizing the penalty for the deviation of $F^{dyn}$ from the unconstrained allocation $F^{unconstr}$ and for violation of the rate of change limits. That is, the dynamic allocation $F^{dyn}$ is obtained by minimizing the following function:

$$f(F, z) = \|F^{dyn} - F^{unconstr}\|_{Q(1)}^2 + \|z\|_{Q(2)}^2 \quad (17)$$

with respect to variables $F^{dyn}$ and z, subject to constraints (9)–(11). It should be noted that the vector $F^{unconstr}$ in equation (17) has a dimension 2N(K+1) similar to the right hand side of equation (13). Function (17) is a quadratic programming problem with dimension 2N(K+1)

The square N(K+1) by N(K+1) norm matrices Q(1) and Q(2) can be chosen as diagonal matrices with elements depending only on boiler i, not on trajectory points k. Accordingly, these matrices may be given by the following equations:

$$Q^{(j)} = \begin{pmatrix} q_1^{(j)} & & \\ & \ddots & \\ & & q_N^{(j)} \end{pmatrix} \quad (18)$$

$$q_i^{(j)} = w_i^{(j)} I \quad (19)$$

where j=1, 2, where I is a (K+1) by (K+1) unity matrix, and where $w_i^{(1)}$ and $w_i^{(2)}$ are penalty weights for i=1, ... N. The penalty weights $w_i^{(1)}$ and $w_i^{(2)}$ may be defined by the process engineer during the optimizer commissioning.

Figure 3:
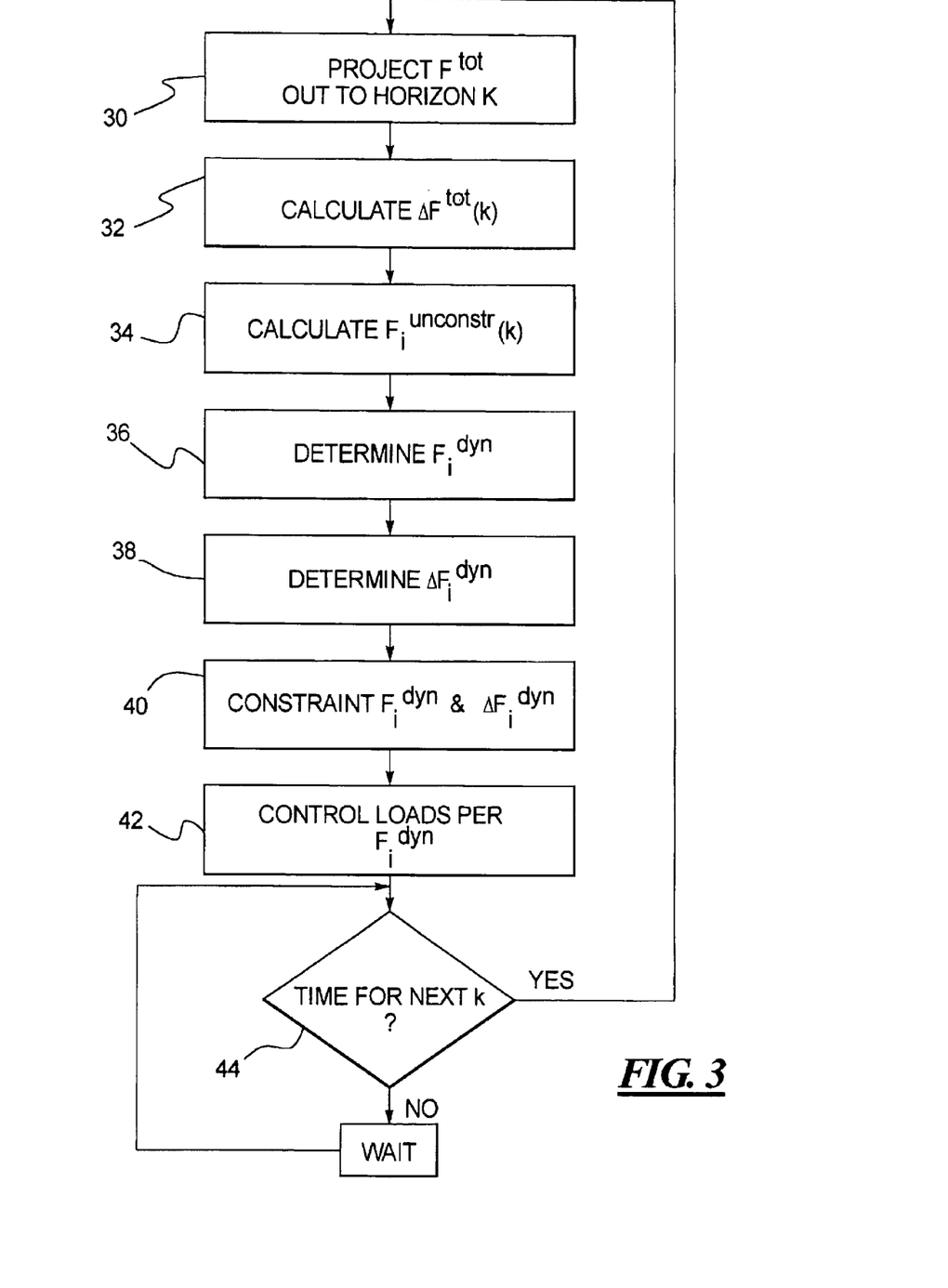
FIG. 3 illustrates a flow chart depicting the operation of the control system shown in FIG. 1.

The control algorithm as described above may be implemented by the control system 10 according to the flow chart shown in FIG. 3. With k equal to a current value, the total energy load demand $F^{tot}(k)$ is projected by the predictive controller 12, at a block 30 of this flow chart, for each point k out to the horizon K. The change in $F^{tot}(k)$, i.e., $\Delta F^{tot}(k)$, is calculated at a block 32 using equation (3) using the predicted steady state target allocations $F_i^{targ}(k)$ set by the real time optimizer 14 as discussed above. Alternatively, the target allocations $F_i^{targ}(k)$ may be determined in accordance with equations (7) and (8) as discussed above. Also, the unconstrained allocation trajectories $F_i^{unconstr}(k)$ are calculated at a block 34 using equation (2), where the target allocations $F_i^{targ}(k)$ are as used at the block 32, where the dynamic weights $w_i^{dyn}(k)$ may be set, for example, by the operator, and where the total energy load demand $F^{tot}(k)$ is provided by the block 30.

The dynamic demand allocation trajectories $F_i^{dyn}(k)$ are then determined at a block 36 in accordance with equations (17), (18), and (19), and the difference vector $\Delta F_i^{dyn}$ is determined at a block 38 in accordance with equations (14), (15), and (16). Constraints are applied to the dynamic allocation trajectories $F_i^{dyn}(k)$ and the difference vector $\Delta F_i^{dyn}$ at a block 40 in accordance with equations (9), (10), and (11). At a block 42, the constrained dynamic demand allocation trajectories $F_i^{dyn}(k)$ are used to control energy supplied to the respective loads 1, ..., N.

The algorithm at a block 44 then waits for the next time k before repeating the operations of the blocks (30)–(44).

Certain modifications of the present invention has been described above. Other modifications of the invention will occur to those skilled in the art. For example, although the present invention has been described above with specific reference to the control of loads such as boilers, the present invention may be used in connection with a variety of other control processes.

Also as described above, the target allocation $F_i^{targ}(k)$ is provided by a Real Time Optimizer. Alternatively, the target allocation $F_i^{targ}(k)$ may be set by an operator.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

I claim:

1. A process control system for controlling a load comprising:
a predictive controller that predicts an energy requirement for the load at prediction points k =0, 1, 2, ..., K based on a steady state target energy requirement for the load; and,
a real time cost optimizer that determines a cost optimized dynamic energy demand requirement for the load at the prediction points k =0, 1, 2, ..., K based on the predicted energy requirement and that controls the load based on the dynamic energy demand requirement.

2. The process control system of claim 1 wherein the real time optimizer is arranged to constrain the dynamic energy demand requirement to a limit and controls the load based on the constrained dynamic energy demand requirement.

3. The process control system of claim 2 wherein the limit comprises a maximum limit.

4. The process control system of claim 2 wherein the limit comprises a minimum limit.

5. The process control system of claim 2 wherein the limit comprises a minimum limit and a maximum limit.

6. The process control system of claim 2 wherein the real time optimizer determines $\Delta F^{dyn}$ according to the following equation:

$$\Delta F^{dyn} = DF^{dyn} - F^{act}$$

wherein D is a (K+1) by (K+1) matrix given by the following equation:

$$D = \begin{pmatrix} 1 & & & \\ -1 & 1 & & \\ & \ddots & \ddots & \\ & & -1 & 1 \end{pmatrix}$$

and wherein $F^{act}$ is a (K+1) dimensional vector representing an actual energy consumption of the load in the first component and zeros elsewhere as given by the following equation:

$$F^{act} = \begin{pmatrix} F^{act} \\ 0 \\ \vdots \\ 0 \end{pmatrix}$$

wherein $F^{dyn}$ is the dynamic energy demand requirement, and wherein $\Delta F^{dyn}$ is constrained to a limit.

7. The process control system of claim 6 wherein the limit for $\Delta F^{dyn}$ comprises a maximum limit.

8. The process control system of claim 6 wherein the limit for $\Delta F^{dyn}$ comprises a minimum limit.

9. The process control system of claim 6 wherein the limit for $\Delta F^{dyn}$ comprises a minimum limit and a maximum limit.

10. The process control system of claim 1 wherein the predicted energy requirement is designated $F^{unconstr}$, wherein the dynamic energy demand requirement is designated $F^{dyn}$, and wherein $F^{dyn}$ is determined by minimizing a quadratic function based on a difference between $F^{unconstr}$ and $F^{dyn}$.

11. The process control system of claim 10 wherein $F^{unconstr}$ and $F^{dyn}$ each have dimensions K+1.

12. The process control system of claim 10 wherein the real time controller is arranged to constrain $F^{dyn}$ to a limit and to control the load based on the constrained $F^{dyn}$.

13. The process control system of claim 12 wherein the limit comprises a maximum limit.

14. The process control system of claim 12 wherein the limit comprises a minimum limit.

15. The process control system of claim 12 wherein the limit comprises a minimum limit and a maximum limit.

16. A process control method for controlling parallel loads 1, 2, ..., N comprising:
 predicting, in a predictive controller, an energy requirement for each of the loads 1, 2, ..., N at prediction points k=0, 1, 2, ..., K based on a steady state target allocation for each of the parallel loads 1, 2, ..., N;
 determining, in a real time optimizer, a dynamic energy demand requirement for each of the parallel loads 1, 2, ..., N at prediction points k=0, 1, 2, ..., K based on the predicted energy requirements so as to cost effectively allocate load demand among the parallel load 1, 2, ..., N; and,
 controlling the loads 1, 2, ..., N based on the dynamic energy demand requirements.

17. The process control method of claim 16 wherein the controlling of the loads based on the dynamic energy demand requirements comprises:
 constraining each of the dynamic energy demand requirements to a corresponding limit; and,
 controlling the loads 1, 2, ..., N based on the corresponding constrained dynamic energy demand requirements.

18. The process control method of claim 17 wherein the corresponding limits comprise corresponding maximum limits.

19. The process control method of claim 17 wherein the corresponding limits comprise corresponding minimum limits.

20. The process control method of claim 17 wherein the corresponding limits comprise corresponding minimum limits and corresponding maximum limits.

21. The process control method of claim 17 further comprising;
 determining $\Delta F_i^{dyn}$ according to the following equation:

$$\Delta F_i^{dyn} = DF_i^{dyn} - F_i^{act}$$

wherein D is a (K+1) by (K+1) matrix given by the following equation:

$$D = \begin{pmatrix} 1 & & & \\ -1 & 1 & & \\ & \ddots & \ddots & \\ & & -1 & 1 \end{pmatrix}$$

and wherein $F_i^{act}$ is a (K+1) dimensional vector having an actual energy consumption of a corresponding one of the loads in the first component and zeros elsewhere as given by the following equation:

$$F_i^{act} = \begin{pmatrix} F_i^{act} \\ 0 \\ \vdots \\ 0 \end{pmatrix}$$

wherein i=1, 2, ..., N designates the loads, wherein $F_i^{dyn}$ designate the dynamic energy demand requirements of the loads 1, 2, ..., N, and wherein $\Delta F_i^{dyn}$ are constrained to corresponding limits.

22. The process control method of claim 21 wherein the corresponding limits for $\Delta F_i^{dyn}$ comprise corresponding maximum limits.

23. The process control method of claim 21 wherein the corresponding limits for $\Delta F_i^{dyn}$ comprise corresponding minimum limits.

24. The process control method of claim 21 wherein the corresponding limits for $\Delta F_i^{dyn}$ comprise corresponding minimum limits and corresponding maximum limits.

25. The process control method of claim 16 wherein the predicted energy requirement for each of the loads 1, 2, ..., N is designated $F_i^{unconstr}$, wherein the dynamic energy demand requirement for each of the loads 1, 2, ..., N is designated $F_i^{dyn}$, wherein $F_i^{dyn}$ is determined by minimizing the following quadratic function:

$$f(F,z) = \|F^{dyn} - F^{unconstr}\|_{Q(1)}^2 + \|z\|_{Q(2)}^2$$

with respect to variables $F^{dyn}$ and z, wherein $F^{dyn}$ and $F^{unconstr}$ are vectors each having a dimension 2N(K+1), wherein Q(1) and Q(2) are each square N(K+1) by N(K+1) norm matrices given by the following equations:

$$Q^{(j)} = \begin{pmatrix} q_1^{(j)} & & \\ & \ddots & \\ & & q_N^{(j)} \end{pmatrix}$$

$$q_i^{(j)} = w_i^{(j)} I$$

wherein I is a (K+1) by (K+1) unity matrix, wherein $w_i^{(1)}$ and $w_i^{(2)}$ are penalty weights for i=1, ..., N, and wherein z is a penalty vector having a 2N(K+1) dimension.

26. The process control method of claim 25 wherein $F^{unconstr}$ and $F^{dyn}$ each have dimensions K+1.

27. The process control method of claim 25 wherein the controlling of the loads 1, 2, ..., N based on the dynamic energy demand requirements comprises:
constraining $F_i^{dyn}$ to corresponding limits; and,
controlling the load based on the constrained $F_i^{dyn}$.

28. The process control method of claim 27 wherein the corresponding limits comprise corresponding maximum limits.

29. The process control method of claim 27 wherein the corresponding limits comprise corresponding minimum limits.

30. The process control method of claim 27 wherein the corresponding limits comprise corresponding minimum limits and maximum limits.

31. A process control method for controlling parallel loads 1, 2, ..., N comprising:
predicting, by way of a predictive controller, a total energy requirement for the parallel loads 1, 2, ..., N at prediction points k=0, 1, 2, ..., K;
allocating, on a cost effective basis by way of a real time optimizer, the total energy requirement to the parallel loads 1, 2, ..., N at the prediction points k=0, 1, 2, ..., K based on a steady state target for each of the parallel loads 1, 2, ..., N;
determining, by way of the real time optimizer, a dynamic energy demand requirement for each of the parallel loads 1, 2, ..., N at the prediction points k=0, 1, 2, ..., K based on the allocated energy requirements; and,
controlling the parallel loads 1, 2, ..., N based on the dynamic energy demand requirements.

32. The process control method of claim 31 wherein the allocating of the total energy requirement to the loads 1, 2, ..., N comprises:
determining a change $\Delta F^{tot}(k)$ in the total energy requirement according to the following equation:

$$\Delta F^{tot}(k) = F^{tot}(k) - \sum_{i=1}^{N} F_i^{targ}(k)$$

for each of the parallel loads i=1, 2, ..., N and for each of the prediction points k=0, 1, ..., K; and,
allocating the total energy requirement to the loads 1, 2, ..., N at prediction points k=0, 1, 2, ..., K according to the following equation:

$$F_i^{allocated}(k) = F_i^{targ}(k) + w_i^{dyn}(k) \Delta F^{tot}(k)$$

wherein $F_i^{targ}(k)$ are the steady state targets for the loads 1, 2, ..., N, and wherein $w_i^{dyn}(k)$ are weights determining the allocation of the total energy requirement.

33. The process control method of claim 32 wherein $w_i^{dyn}(k)$ are set by an operator.

34. The process control method of claim 32 wherein $w_i^{dyn}(k)$ are set by an economic load allocation module.

35. The process control method of claim 32 wherein $F_i^{targ}(k)$ are set by an operator.

36. The process control method of claim 32 wherein $F_i^{targ}(k)$ are set by an economic load allocation module.

37. The process control method of claim 31 wherein the controlling of the loads 1, 2, ..., N based on the dynamic energy demand requirements comprises:
constraining each of the dynamic energy demand requirements to a corresponding limit; and,
controlling the loads 1, 2, ..., N based on the corresponding constrained dynamic energy demand requirements.

38. The process control method of claim 37 wherein the corresponding limits comprise corresponding maximum limits.

39. The process control method of claim 37 wherein the corresponding limits comprise corresponding minimum limits.

40. The process control method of claim 37 wherein the corresponding limits comprise corresponding minimum limits and corresponding maximum limits.

41. The process control method of claim 31 wherein the total energy requirements allocated to the loads 1, 2, ..., N at prediction points k=0, 1, 2, ..., K are designated $F_i^{dyn}$, and wherein the process control method further comprises;
determining a change $\Delta F_i^{dyn}$ in the total energy requirements allocated to the loads 1, 2, ..., N according to the following equation:

$$\Delta F_i^{dyn} = DF_i^{dyn} - F_i^{act}$$

wherein D is a (K+1) by (K+1) matrix given by the following equation:

$$D = \begin{pmatrix} 1 & & & \\ -1 & 1 & & \\ & \ddots & \ddots & \\ & & -1 & 1 \end{pmatrix}$$

and wherein $F_i^{act}$ is a (K+1) dimensional vector having an actual energy consumption of the corresponding loads in the first component and zeros elsewhere as given by the following equation:

$$F_i^{act} = \begin{pmatrix} F_i^{act} \\ 0 \\ \vdots \\ 0 \end{pmatrix}$$

wherein i=1, 2, ..., N designates the loads, and wherein $\Delta F_i^{dyn}$ is constrained to a corresponding limit.

42. The process control method of claim 41 wherein the corresponding limits for $\Delta F_i^{dyn}$ comprise corresponding maximum limits.

43. The process control method of claim 41 wherein the corresponding limits for $\Delta F_i^{dyn}$ comprise corresponding minimum limits.

44. The process control method of claim 41 wherein the corresponding limits for $\Delta F_i^{dyn}$ comprise corresponding minimum limits and corresponding maximum limits.

45. The process control method of claim 31 wherein the total energy requirement allocated to each of the loads 1, 2, ..., N is designated $F_i^{unconstr}$, wherein the dynamic energy demand requirement for each of the loads 1, 2, ..., N is designated $F_i^{dyn}$, and wherein $F_i^{dyn}$ is determined by minimizing the following quadratic function:

$$f(F,z) = \|F^{dyn} - F^{unconstr}\|_{Q(1)}^2 + \|z\|_{Q(2)}^2$$

with respect to variables $F^{dyn}$ and z, wherein $F^{dyn}$ and $F^{unconstr}$ are vectors each having a dimension 2N(K+1), wherein Q(1) and Q(2) are each square N(K+1) by N(K+1) norm matrices given by the following equations:

$$Q^{(j)} = \begin{pmatrix} q_1^{(j)} & & \\ & \ddots & \\ & & q_N^{(j)} \end{pmatrix}$$

$$q_i^{(j)} = w_i^{(j)} I$$

wherein j =1, 2, wherein I is a (K+1) by (K+1) unity matrix, wherein $w_i^{(1)}$ and $w_i^{(2)}$ are penalty weights for i=1, ..., N, and wherein z is a penalty vector having a 2N(K+1) dimension.

46. The process control method of claim 45 wherein $F^{unconstr}$ and $F^{dyn}$ each have dimensions K+1.

47. The process control method of claim 45 wherein the controlling of the loads 1, 2, ..., N based on the dynamic energy demand requirements comprises:

constraining $F_i^{dyn}$ to corresponding limits; and, controlling the load based on the constrained $F_i^{dyn}$.

48. The process control method of claim 47 wherein the corresponding limits comprise corresponding maximum limits.

49. The process control method of claim 47 wherein the corresponding limits comprise corresponding minimum limits.

50. The process control method of claim 47 wherein the corresponding limits comprise corresponding minimum limits and maximum limits.

51. A process control system for controlling loads comprising:

a predictive controller that predicts energy requirements for the loads by projecting the energy requirements out to the end of a prediction horizon; and, a real time cost optimizer that dynamically responds to the predicted energy requirements by dynamically determining cost optimized dynamic energy demand requirements for the loads and by controlling the loads based on the dynamically determined energy demand requirements.

\* \* \* \* \*